(12) United States Patent
Bald

(10) Patent No.: US 7,772,728 B2
(45) Date of Patent: Aug. 10, 2010

(54) ELECTRIC DRIVE SYSTEM FOR FLOOR CONVEYANCES

(75) Inventor: Dirk Bald, Gotha (DE)

(73) Assignee: ZF Friedrichshafen AG, Friedrichshafen (DE)

(*) Notice: Subject to any disclaimer, the term of this patent is extended or adjusted under 35 U.S.C. 154(b) by 678 days.

(21) Appl. No.: 11/392,412

(22) Filed: Mar. 29, 2006

(65) Prior Publication Data

US 2006/0232146 A1  Oct. 19, 2006

(30) Foreign Application Priority Data

Apr. 15, 2005 (DE) .................. 10 2005 017 736

(51) Int. Cl.
*H02K 9/19* (2006.01)
*B62D 61/00* (2006.01)

(52) U.S. Cl. .................... 310/54; 180/21
(58) Field of Classification Search .............. 310/52, 310/54, 58, 59; 180/65.1, 65.51, 65.6, 252, 180/253
See application file for complete search history.

(56) References Cited

U.S. PATENT DOCUMENTS

| | | | | |
|---|---|---|---|---|
| 5,649,605 A | * | 7/1997 | Rønne et al. ............ | 180/23 |
| 6,046,520 A | * | 4/2000 | Betsch et al. ........... | 310/54 |
| 6,833,641 B2 | * | 12/2004 | Uchida et al. .......... | 310/54 |
| 2003/0155163 A1 | * | 8/2003 | Sugata et al. .......... | 180/199 |
| 2005/0151431 A1 | * | 7/2005 | Cronin et al. .......... | 310/60 A |

FOREIGN PATENT DOCUMENTS

| | | |
|---|---|---|
| DE | 100 39 381 A1 | 2/2002 |
| DE | 102 41 420 A1 | 3/2004 |
| DE | 103 28 651 A1 | 1/2005 |

* cited by examiner

*Primary Examiner*—Truc T Nugyen
*Assistant Examiner*—Jason Collins
(74) *Attorney, Agent, or Firm*—Davis & Bujold, P.L.L.C.

(57) ABSTRACT

An electric, drive system for floor conveyances with one or more vehicle chassis (3; 10, 11) in active connection with one another allowing relative movement and with at least one electric, drive motor and/or an electric, steering motor, with an electric transverter associated with each of these and an electronic, control system. At least one of these electric or electronic components is designed to be cooled by a liquid and is connected via an associated cooling circuit (5; 12) to at least one cooling device.

20 Claims, 3 Drawing Sheets

ELECTRIC DRIVE SYSTEM FOR FLOOR CONVEYANCES

This application claims priority from German Application Serial No. 10 2005 017 736.0 filed Apr. 15, 2005.

FIELD OF THE INVENTION

The invention concerns an electric drive system for floor conveyances with one or more vehicle chassis in active connection with one another allowing relative movement with at least one electric, traction motor and/or an electric, steering motor and, in each case, an electric transverter and control electronics associated therewith.

BACKGROUND OF THE INVENTION

DE 100 39 381 A1 discloses a drive system for a floor conveyance, in particular a lifting trolley, which comprises two essentially co-axial wheels with a transmission arranged at least partially between them. The wheels can be driven by an electric, traction motor, here called the drive motor, via the interposed transmission. In addition, an electric, steering drive can be provided. The transmission housing, together with the wheels, are attached to a chassis of the floor conveyance and able to swivel about a substantially vertical axis.

From DE 103 28 651 A1 a comparable arrangement concerning a drive system for a floor conveyance is known, whose structure is intended to be particularly space-saving. Accordingly, the drive motor is connected with a steering motor co-axially adjacent to and underneath it, which is attached to a chassis component of the floor conveyance. An outer bushing of a bearing arrangement is bolted to the chassis component, co-axial with the drive motor, and thus also with the steering motor. An inner bushing of the bearing arrangement is connected to a housing cover of a drive transmission, which serves as a center pivot plate. On the center pivot plate or housing of the drive transmission is mounted at least one rotating wheel, which can be driven by the drive motor with the drive transmission interposed.

The electric drives of known floor conveyances mainly consist of a three-phase motor with an associated electric transverter and corresponding control electronics. It is obvious to those familiar with the subject that the operation of such drive systems and the efforts to make them compact results in increased development of heat.

To avoid heat concentration and overheating of the motors, the transverter and/or other electrical or electronic components, conventionally the system is cooled by convection or, as indicated in more detail in DE 102 41 420 A1, by way of a fan-wheel arranged on the motor shaft. It is evidently insufficient when a very compact structure of the drive system allows only limited free space for the cooling airflow.

Against that background the purpose of the invention is to provide an electric drive system for floor conveyances, with improved cooling performance.

SUMMARY OF THE INVENTION

The objective set is achieved by an electric drive system for floor conveyances with one or more vehicle chassis in active connection with one another allowing relative movement, and with at least one electric, drive motor and/or an electric, steering motor, an electric transverter associated with each of them, and control electronics, such that at least one of these electrical or electronic components is designed to be cooled by a liquid and is connected to at least one cooling device via an associated cooling circuit.

According to the invention, the heat produced in the electric, drive system for floor conveyances is now dissipated by coolant liquid. This results in better cooling performance compared with conventional air cooling, so allowing a still more compact structure of the electric, drive system. Furthermore, thanks to this measure, the system can be made a closed one as much as possible, so virtually excluding the ingress of dirt from outside.

In a particularly advantageous design of the invention, coolant liquid flows through the walls of the housings of the electric components. This measure is particularly effective in removing the heat from where it is produced.

In an extension of the invention, it is further proposed that some of the electric components are arranged in a separate housing or in a common housing with other components.

Further, in the context of the invention, it is proposed that the wall of the housing is formed as a single-shell, cast component in which, respectively, one or more ducts for conveying the coolant liquid are cast or machined.

Another advantageous design of the invention envisages that the wall of the housing is formed in several shells and that one or more ducts for conveying the coolant liquid are arranged; fixed within the wall in the form of tubes.

As also envisaged by the invention, the housings or their ducts can be in flow connection with a transmission associated with the drive motor so that the coolant liquid consists of a transmission oil.

Likewise, it is conceivable for the housings or their ducts to be in flow connection with a steering transmission, again, so that the coolant liquid is the transmission oil.

On the other hand, the housings or their ducts can be in flow connection with a hydraulic device, such as a hydraulic hoist, and the coolant liquid then consists of the hydraulic oil. These technical solutions advantageously make it unnecessary to have a separate coolant liquid.

Further, it is proposed that the housings or their ducts are connected to the cooling circuit by rigid and/or flexible convection lines.

According to a further advantageous design of the invention, it is provided that to produce a flow of coolant liquid in the cooling circuit, at least one pump and/or turbine is incorporated in the latter.

Expediently, the pump and/or turbine can be made to be powered directly by the drive motor, the steering motor or by an associated transmission.

However, to produce a coolant liquid flow in the coolant circuit, it can also be appropriate for one or more separately operated and, in particular, electrically operated pumps and/or turbines to be provided, which can then be operated depending on the current cooling requirements of the electric or electronic components.

Finally, as the invention also envisages, the cooling circuit can be constructed or connected in such a manner that coolant liquid, heated by electric or electronic components, first passes through any transmission involved before giving up the heat it has taken up to a downstream cooling device. This measure allows the temperature of the transmission oil to be increased, if necessary, which can improve the efficiency of the transmission concerned.

BRIEF DESCRIPTION OF THE DRAWINGS

The invention will now be described, by way of example, with reference to the accompanying drawings in which.

DETAILED DESCRIPTION OF THE INVENTION

Figure 1:
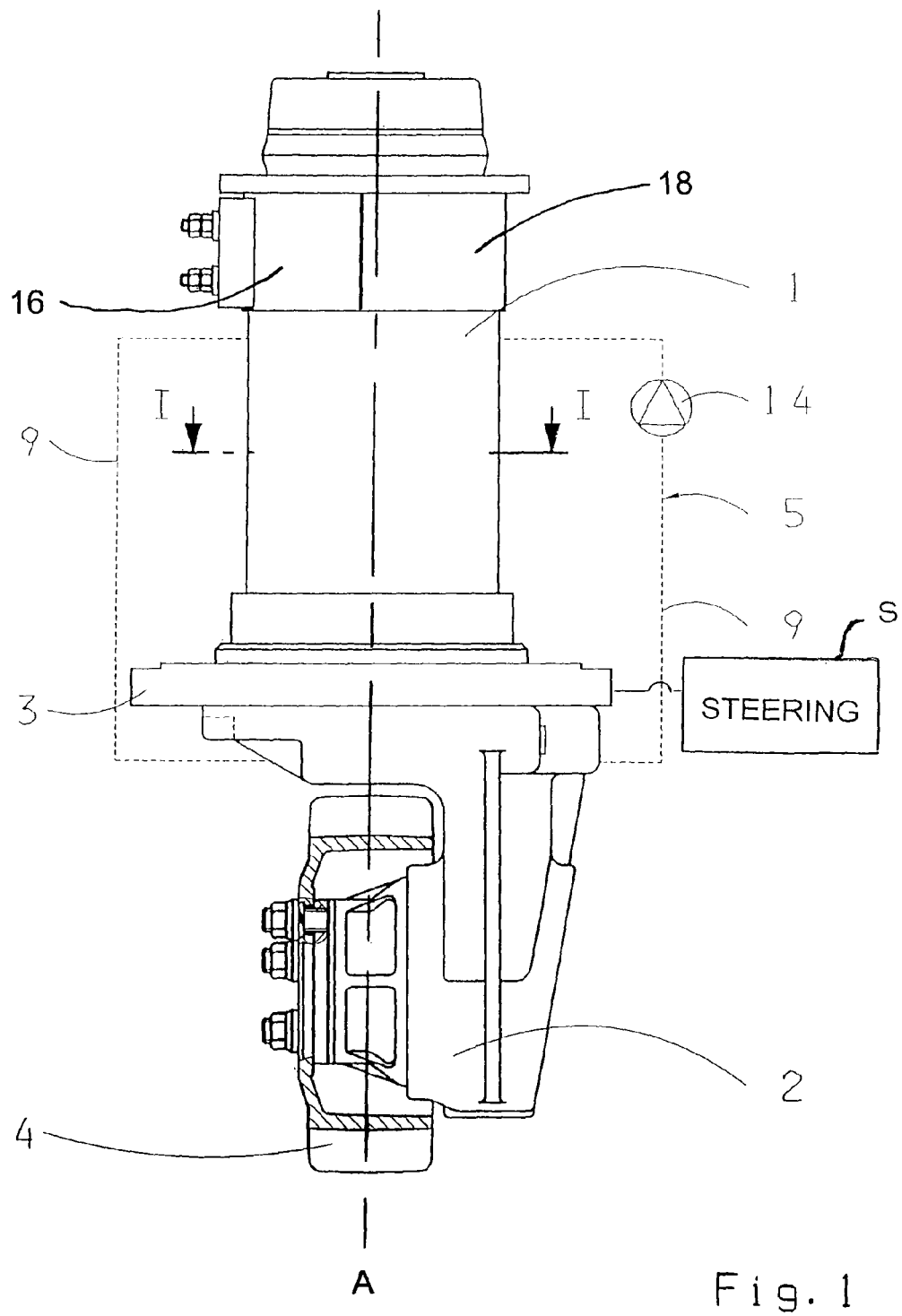
FIG. 1 is a schematic view of a first embodiment of an electric drive system for floor conveyances, according to the invention.

FIG. 1 shows an electric drive system for floor conveyances with an electric, drive motor arranged vertically, whose housing 1 is in fixed connection with a transmission 2 associated therewith.

The housing 1 of the drive motor and the housing of the transmission 2 form, as it were, a unit structure and are supported on a chassis 3 of the floor conveyance which can be, for example, a fork-lift, and are enabled to swivel by way of a roller bearing (not shown).

At least one wheel 4, which is in active connection with the transmission 2, is mounted to rotate on the housing of the transmission 2 so that during a steering movement both the housing 1 of the drive motor and the housing of the transmission 2 rotate together with the wheel 4 in the same direction about a common vertical axis.

The electric drive motor is, in this case, made as a three-phase motor with which, for its part, are associated further electric components such as an electric transverter and a corresponding electronic, control system (not shown).

To overcome the problem of disadvantageous heat concentration effectively, the drive motor at least is designed to be cooled by a liquid and is, therefore, connected via an associated cooling circuit 5 to at least one cooling device, known in its own right, and therefore not illustrated further here.

Figure 2:
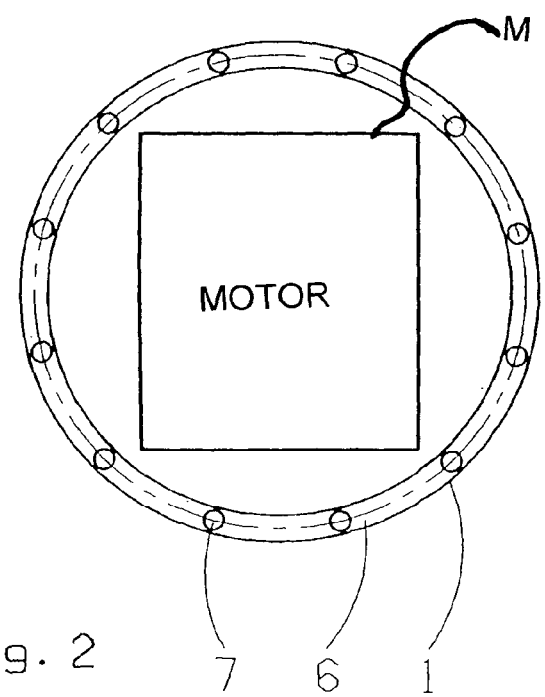
FIG. 2 is a sectioned view of the housing of an electric drive motor of the drive system in FIG. 1 (Section I-I)

According to a preferred embodiment, it is provided that a suitable coolant liquid flows through a wall 6 of the housing 1 of the drive motor. In this case, the wall 6 is formed as a single-shell, cast component and comprises one or more ducts 7 to convey the coolant liquid (FIG. 2).

For their part, the ducts 7 are connected to the cooling circuit 5 by connection means known in themselves and, therefore, not described in more detail here. By an appropriate choice or design of the ducts 7 and so too, therefore, of their surface areas available for cooling, the cooling performance can be increased or regulated as desired within wide limits and as a result the structural size of the electrical components concerned can be reduced.

It is conceivable, however, and is subsumed by the invention, that the wall 6 of the housing 1 is constructed as several shells in which one or more ducts 7 in the form of tubes are arranged (not illustrated further).

This example embodiment relates to a liquid-cooled, drive motor. However, the invention extends to any electrical components that, for their part, produce heat themselves or are influenced adversely by heat and can be cooled by a liquid. Thus an electric, steering motor that may be present, the transverter associated with the motors and the necessary control electronics, can be designed to be liquid-cooled, as necessary.

Figure 3:
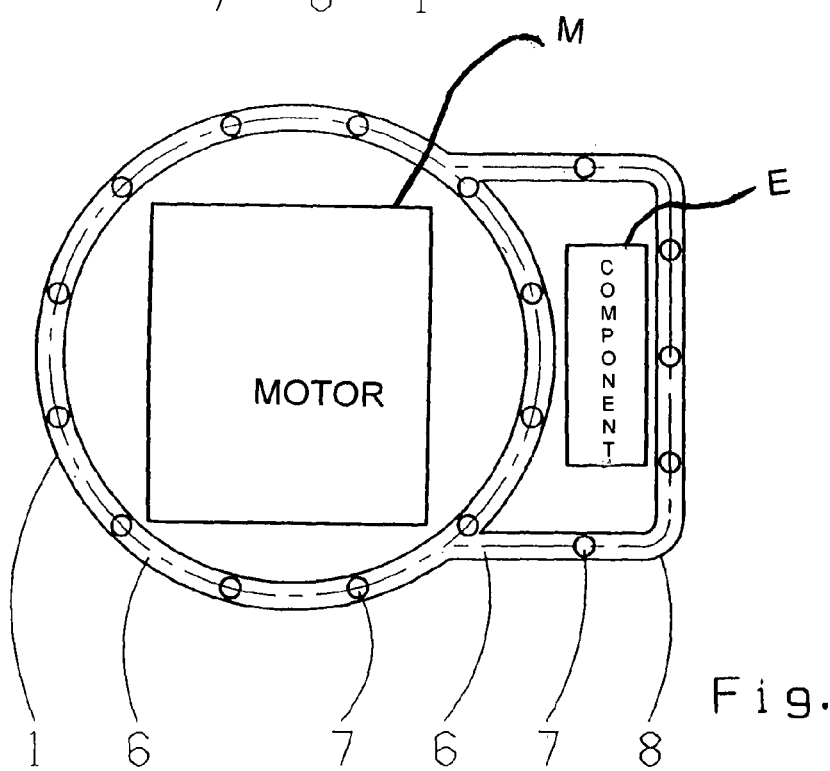
FIG. 3 is a sectioned view of another possible design of the housing of the electric drive motor.

Accordingly as an example, FIG. 3 shows a combination of a housing 1 for the drive motor and a housing 8 for a transverter and/or the control electronics. The two housings 1 and 8 are preferably combined with one another and so made as a single casting. Of course, it can also be appropriate to provide separate housings 1, 8 for the respective electric components.

In the case of the example embodiment shown in FIG. 1, which has a drive motor housing 1 in fixed connection with the housing of the transmission 2, it is expedient to use transmission oil as the coolant liquid since the ducts 7 of the drive motor's housing 1, together with the transmission 2, are incorporated in the cooling circuit 5.

Certainly, some type of electric steering motor (not shown here), but sometimes present as in the version, according to DE 103 28 651 A1, can also be incorporated in the cooling circuit 5 and, in that case, a steering transmission can also be cooled with it.

As regards the connection of the housings 1 and 8 or their ducts 7 to the cooling circuit 5, both rigid and flexible connection lines 9 can be used.

Figure 4:
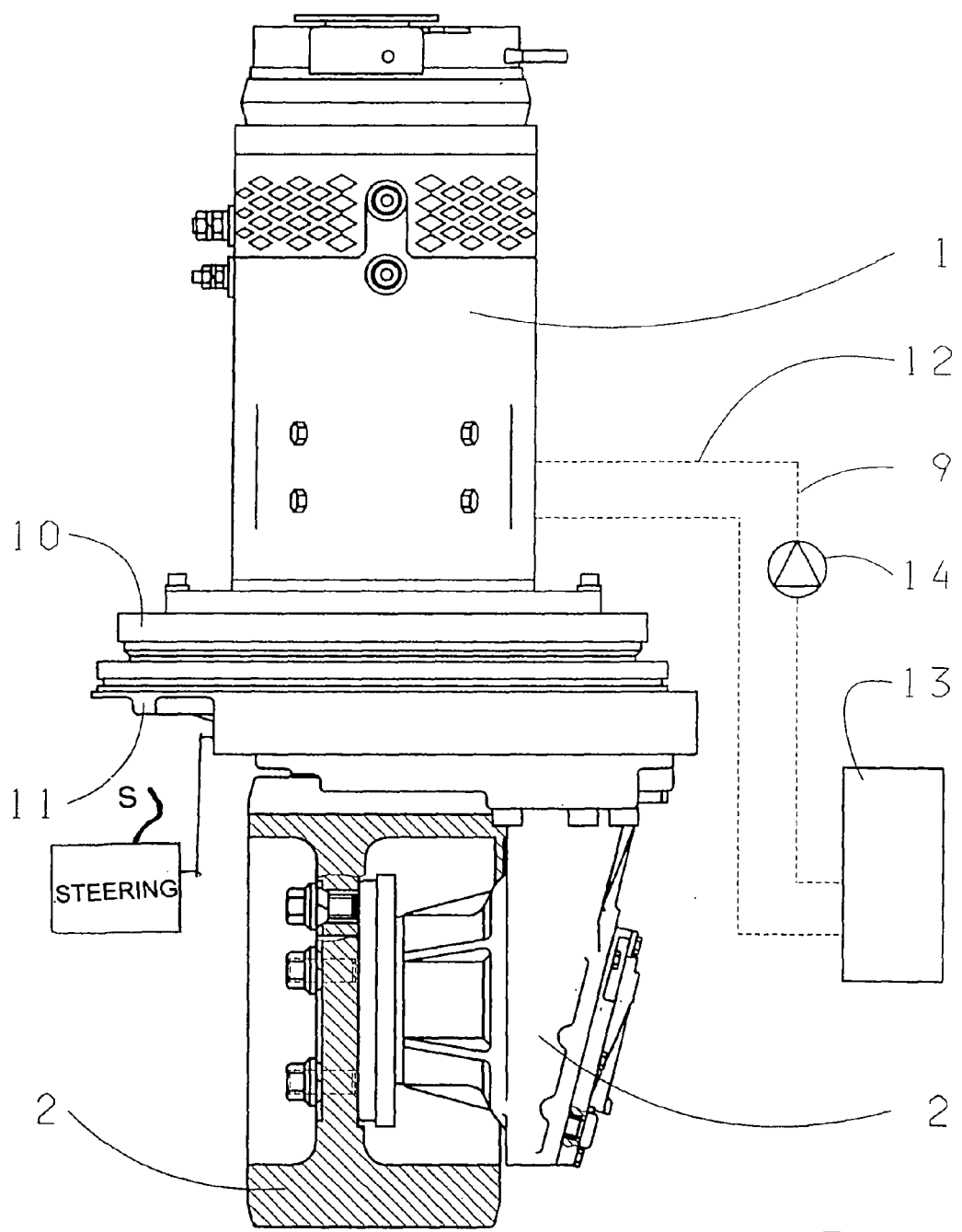
FIG. 4 is a second embodiment of an electric, drive system for floor conveyances, according to the invention.

FIG. 4 shows another possible embodiment of an electric, drive system for floor conveyances constructed in accordance with the invention. This differs from the embodiment described earlier in that the housing 1 of the drive motor is in fixed connection with a first vehicle chassis 10, which forms the basic chassis of the floor conveyance and cannot therefore rotate.

The transmission 2, together with the wheel 4, are attached to another chassis frame 11, which is connected to the chassis 10 or basic frame by a roller bearing (not shown) that allows movement relative to the chassis 10. Thus during steering, the transmission 2 rotates about a vertical axis relative to the housing 1 of the drive motor.

Since the relative movement takes place between the housing 1 of the drive motor and the housing of the transmission 2 during steering, it is expedient to provide flexible connection lines 9 so as to be able to incorporate the ducts 7 of the housing 1 of the drive motor in a common cooling circuit 5 with the transmission 2, as in the cooling variant described earlier (not shown).

In contrast, FIG. 4 shows a cooling circuit 12 which, for its part, is provided only for dissipating the heat produced in the drive motor.

Considering the case when the floor conveyance consists of a fork-lift, it is advantageous for the housing 1 of the drive motor or its ducts 7 to be in flow connection with a hydraulic device 13, in this case, in the form of the lifting hydraulic system, the coolant liquid then consisting of hydraulic oil.

To produce a flow of coolant liquid in the respective cooling circuits 5, 12, at least one pump 14 known as such and/or a turbine is connected to a rotating component. The pump 14 and/or turbine can be driven directly by the drive motor by a steering motor or by an associated transmission 2, if necessary, at the rotation speed of the motor or transmission.

Of course, separately operated and, in particular, electrically powered pumps 14 and/or turbines can be provided, which can preferably be actuated depending on the cooling needs of the electric components concerned. Thus, energy is only consumed for the coolant flow when cooling is actually needed.

Furthermore, it has proved expedient, especially in relation to the first example embodiment, to construct the cooling circuit 5 in such a manner that cooling liquid heated by electric components, in this case transmission oil heated by the drive motor and or the transverter and/or the control electronics, first passes through the transmission 2 before giving up the heat energy it has collected to a cooling device, if necessary, connected downstream therefrom. This deliberate elevation of the transmission, oil temperature results in a particularly advantageous improvement in the efficiency of the transmission 2 concerned.

REFERENCE NUMERALS 1 housing of the drive motor
2 transmission; transmission housing 3 vehicle chassis
4 wheel
5 cooling circuit
6 wall
7 ducts
8 housing
9 connection lines
10 vehicle chassis
11 vehicle chassis frame
12 cooling circuit
13 hydraulic device
14 pump

The invention claimed is:

1. An electric drive system for facilitating conveyance of a vehicle, the electric drive system comprising:
   a cylindrical housing (1) accommodating an electric drive motor (M) and the electric drive motor (M) driving a wheel (4) via a transmission (2), coupling the electric drive motor (M) to the wheel (4), and the electric drive motor (M) being vertically aligned with and located over the wheel (4);
   an electric steering motor (S) being coupled to at least one of the electric drive motor (M), the cylindrical housing (1) and the transmission (2) for rotating at least the transmission (2) and the wheel (4) and facilitate steering of the electric drive system, and the drive motor (M) and the steering motor (S) being coaxial with one another;
   the cylindrical housing (1) being supported by a chassis of the vehicle and a wall (6) of the cylindrical housing (1) having at least one fluid cooling duct (7) therein for conveying a coolant liquid through the at least one cooling duct (7) to facilitate direct cooling of the cylindrical housing (1) as well as cooling of both of the drive motor (M) and the transmission (2); and
   a cooling circuit being connected to the at least one cooling duct (7) for conveying a coolant liquid through the at least one cooling duct (7) and cooling at least the electric drive motor (M) accommodated within the cylindrical housing (1).

2. The electric drive system of claim 1, wherein a wheel is mounted on a housing of the transmission such that the wheel, the electric drive motor, and the transmission rotate together about a common vertical axis.

3. The electric drive system according to claim 2, wherein the electric drive motor and at least one component of the electric drive system are arranged in the cylindrical housing (1) and cooled by the cooling circuit.

4. The electric drive system according to claim 2, wherein the wall (6) of the housing (1, 8) is formed as a single-shell casted component in which at least one duct (7) is formed within the housing (1, 8) for conveying the coolant liquid.

5. The electric drive system according to claim 2, wherein the wall (6) of the housing (1, 8) comprises a plurality of shells in which the at least one fluid cooling duct (7), in the form of a tube, is arranged for conveying the coolant liquid.

6. The electric drive system according to claim 4, wherein the coolant liquid comprises transmission oil and at least one of the housing (1, 8) and the at least one fluid cooling duct (7) is in fluid communication with the transmission (2) coupled to the drive motor (M).

7. The electric drive system according to claim 4, wherein the coolant liquid comprises transmission oil and at least one of the housing (1, 8) and the at least one fluid cooling duct (7) is in fluid communication with the steering motor.

8. The electric drive system according to claim 4, wherein the coolant liquid comprises hydraulic oil and the housing (1, 8) and the at least one fluid cooling duct (7) is in fluid communication with a hydraulic device (13).

9. The electric drive system according to claim 1, wherein at least one of the housing (1, 8) and the at least one fluid cooling duct (7) is connected to the cooling circuit (5; 12) by one of rigid and flexible connection lines (9).

10. The electric drive system according to claim 1, wherein at least one of a pump (14) and a turbine is incorporated in the cooling circuit (5; 12) for generating a flow of coolant liquid therein.

11. The electric drive system according to claim 10, wherein at least one of the pump (14) and the turbine is powered directly by one of the drive motor, the steering motor (S) and the transmission (2).

12. The electric drive system according to claim 1, wherein at least one of a separately operated electrically powered pump (14) and a separately operated turbine is provided for generating a flow of the coolant liquid through the coolant circuit (5; 12).

13. The electric drive system according to claim 1, wherein at least one of a separately operated electrically powered pump (14) and a separately operated turbine are designed for operation depending on actual cooling needs of at least one of electric and an electronic component (E).

14. The electric drive system according to claim 1, wherein the wheel (4) is driven by the electric steering motor (S) to rotate about a vertical axis and is driven by the electric drive motor (M) to rotate about another axis that is essentially normal to the vertical axis.

15. The electric drive system according to claim 14, wherein the cylindrical housing defines the vertical axis.

16. An electric drive system for facilitating conveyance of a vehicle, the electric drive system comprising:
   a cylindrical housing (1) accommodating an electric drive motor (M) driving a wheel (4), via a transmission (2), directly coupling the electric drive motor (M) to the wheel (4), and the electric drive motor (M) being vertically aligned with and located directly over the wheel (4), with the transmission (2) being located between the electric drive motor (M) and the wheel (4), the transmission being fixed with respect to the electric drive motor (M) such that the transmission, the electric drive motor (M) and the wheel (4) all axially aligned with one another so as to rotate about a common vertical axis;
   an electric steering motor (S) being coupled to at least one of the electric drive motor (M), the cylindrical housing (1) and the transmission (2) for rotating at least the transmission (2) and the wheel (4) and facilitate steering of the electric drive system, and the drive motor (M) and the steering motor (S) being coaxial with one another;
   the cylindrical housing (1) being supported by a chassis of the vehicle and a wall (6) of the cylindrical housing (1) having at least one fluid cooling duct (7) therein for conveying a coolant liquid through the cylindrical housing (1) to facilitate cooling of the cylindrical housing (1), and the cylindrical housing (1) of the drive motor (M) and a housing of the transmission (2) together form a unitary structure;
   a cooling circuit being connected to the at least one cooling duct (7) for conveying a coolant liquid through the at least one cooling duct (7) and cooling at least the electric drive motor (M), the electric steering motor (S) and at least one of a transverter (16) and an electronic control system (18) accommodated within the cylindrical housing (1); and
   at least one of rigid and flexible connection lines (9) coupling the at least one cooling duct (7) to the cooling circuit (5; 12), and the cooling circuit (5; 12) has at least one of a pump (14) and a turbine for generating a flow of coolant liquid through the cooling circuit (5; 12).

17. The electric drive system according to claim 16, wherein the wheel (4) is driven by the electric steering motor (S) to rotate about another axis that is essentially normal to the vertical axis.

18. The electric drive system according to claim 17, wherein the cylindrical housing defines the vertical axis.

19. An electric drive system for facilitating conveyance of a vehicle, the electric drive system comprising:
- a cylindrical housing (1) defining a vertical axis and accommodating an electric drive motor (M) and the electric drive motor (M) driving a single wheel (4) via a transmission (2), coupling the electric drive motor (M) to the wheel (4), and the electric drive motor (M) being directly vertically aligned with and concentric with the vertical axis and a steering axis of the wheel (4) with the transmission (2) being located between the electric drive motor (M) and the wheel (4);
- an electric steering motor (S) being coupled to at least one of the electric drive motor (M), the cylindrical housing (1) and the transmission (2) for rotating at least the transmission (2) and the wheel (4) to facilitate steering of the electric drive system, and the drive motor (M) and the steering motor (S) being coaxial with one another and the vertical axis;
- the cylindrical housing (1) being supported by a chassis of the vehicle and a wall (6) of the cylindrical housing (1) having at least one fluid cooling duct (7) therein for conveying a coolant liquid through the cylindrical housing (1) and facilitate cooling of the cylindrical housing (1), and the cylindrical housing (1) of the drive motor (M) and a housing of the transmission (2) together form a unitary structure;
- a cooling circuit being connected to the at least one cooling duct (7) for conveying a coolant liquid through the at least one cooling duct (7) and cooling at least the electric drive motor (M) accommodated within the cylindrical housing (1); and
- at least one of rigid and flexible connection lines (9) coupling the at least one cooling duct (7) to the cooling circuit (5; 12), and the cooling circuit (5; 12) has at least one of a pump (14) and a turbine for generating a flow of coolant liquid through the cooling circuit (5; 12).

20. The electric drive system according to claim 19, wherein the wheel (4) is driven by the electric steering motor (S) to rotate about the vertical axis and is driven by the electric drive motor (M) to rotate about another axis that is essentially normal to the vertical axis.

* * * * *